April 6, 1954 W. D. HOUGHTON 2,674,650

COLOR TELEVISION SYNCHRONIZING SYSTEM

Filed Jan. 24, 1951 3 Sheets-Sheet 1

INVENTOR
William D. Houghton
BY
Charles H. Brown
ATTORNEY

COLOR TELEVISION SYNCHRONIZING SYSTEM

Filed Jan. 24, 1951

INVENTOR
William D. Houghton
BY
Charles H. Brown
ATTORNEY

April 6, 1954 W. D. HOUGHTON 2,674,650

COLOR TELEVISION SYNCHRONIZING SYSTEM

Filed Jan. 24, 1951 3 Sheets-Sheet 3

INVENTOR
William D. Houghton
BY
Charles H. Brown
ATTORNEY

Patented Apr. 6, 1954 2,674,650

UNITED STATES PATENT OFFICE 2,674,650

COLOR TELEVISION SYNCHRONIZING SYSTEM

William D. Houghton, Princeton, N. J., assignor to Radio Corporation of America, a corporation of Delaware Application January 24, 1951, Serial No. 207,509

6 Claims. (Cl. 178—5.4)

This invention relates to improvements in synchronizing circuits for time division multiplex systems.

Time division multiplex systems are known in which a plurality of different signal waves, representative of different sources of information, are divided into a multiplicity of sampled parts and these sampled parts are transmitted in sequence over a common transmission medium. These sampled parts are in the form of short pulses. The pulses from the different waves are interlaced or interleaved to form a sequential series or frame which is repeated many times per second. The selection of the sampled parts from the different signals is normally maintained in uniform sequence by means of a suitable commutating arrangement such as a sampling oscillator. At the receiver, there is provided a similar commutating arrangement under the control of which the individual portions of each signal wave are directed to separate channel units where the original signal wave is reproduced.

In order to provide the effect of simultaneousness in transmission and reception, only discrete portions of the different signal waves are transmitted and the sampling rate is made higher than the highest modulation frequency. By this means, the recombined parts of the signal waves at the receiver will correspond to the original signal waves in sufficient detail as to be a practical reproduction thereof.

It will be clear that for accuracy in reproducing the original signal waves, the receiving sampling oscillator must be maintained in exact synchronism with the corresponding sampling oscillator located at the transmitting end of the system. In order to maintain this synchronism, prior systems have made use of synchronizing signals sent out from the transmitting end of the system and which are utilized at the receiver to control the frequency of the local sampling oscillator. Normally the sampling oscillator at the receiver is provided with an automatic frequency control circuit of the flywheel type in which a control voltage is developed in accordance with the degree of asynchronism between the oscillator output and the synchronizing signals. This control voltage varies the frequency of the oscillator to cause it to attain synchronism.

The use of such automatic frequency control circuits, as will be explained below in more detail, produces an inherent delay between the pulses of the local oscillator and the synchronizing pulses.

Accordingly, it is an object of this invention to provide improved synchronizing circuits in which the effects of mis-timing or phase shifts in the associated apparatus are eliminated.

It is a further object of the invention to provide automatic means for correcting the time variations inherent in conventional flywheel synchronizing circuits.

Another object of the invention is the provision of improved synchronizing circuits which automatically provide a predetermined time interval between the production of pulses in two pulse generators.

Still another object of the invention is the provision of improved means for maintaining in a color television receiver a predetermined phase relationship between the scanning synchronizing pulses and the sampling pulses.

Briefly, in accordance with the invention, pulses from the local synchronizing pulse generator at the receiver are applied over a first path to a second pulse generator. The direct current control voltage developed by the conventional automatic frequency control circuits of the local pulse generator is applied over a second path to the second pulse generator to shift the phase of the pulses of the second pulse generator by an amount equal and opposite to the inherent time variation introduced by the automatic frequency control circuits. The latter pulses are used to key the sampling oscillator. In this way, the effects of timing or phase shifts are eliminated.

The above and other objects and advantages of the invention will become apparent upon a consideration of the following detailed description, taken in conjunction with the accompanying drawings in which.

The principles of time division multiplexing have been applied to many types of communication apparatus, for example in the telegraphy, telephony, and television arts. For the purposes of illustration, the invention will be applied to a color television system of the element sequential type. It is to be understood, however, that the principles of the invention are not limited thereto.

One color television system of this type, known as the "RCA Color Television System," provides at the transmitting studio three color component signals of the picture to be transmitted, one for each of the three color components, red, green and blue. By employing time division multiplex transmission principles of operation, the color information of the three component signals is transmitted from the broadcasting studio to the remotely located television receivers. Sampling oscillators are used at the transmitting end of the system and at the receiver. Synchronizing signals are used to maintain these oscillators in synchronism. A sampling frequency of 3.6 megacycles has been used in the "RCA Color Television System" with excellent results. For a more detailed description of this system reference is herein made to the following publication of the Radio Corporation of America: "RCA Bulletins on Color Television and UHF, October 1949 to July 1950."

Presently, there are two well known methods of conveying the synchronizing information to the receiver. One method involves transmitting a number of cycles of the sampling frequency at a time immediately following the horizontal synchronizing pulse, i. e., during the time of the "back porch" portion of the signal. This method of synchronizing is commonly referred to as the "burst method," since the synchronizing signal appears as a burst of the sampling frequency signal in the blacker than black region of the signal. The other method of synchronization is referred to as the "horizontal synchronizing pulse color hold method."

In the latter method, the horizontal synchronizing pulses are employed to synchronize the sampling frequency oscillator at the receiver, and extreme accuracy in timing must be maintained between the received synchronizing pulses and the sampling frequency oscillator. It is also necessary that the difference in time between the production of a deflection synchronizing pulse and the sampling pulses be maintained constant. It is to this method of operation that the invention is primarily directed.

Figure 1:
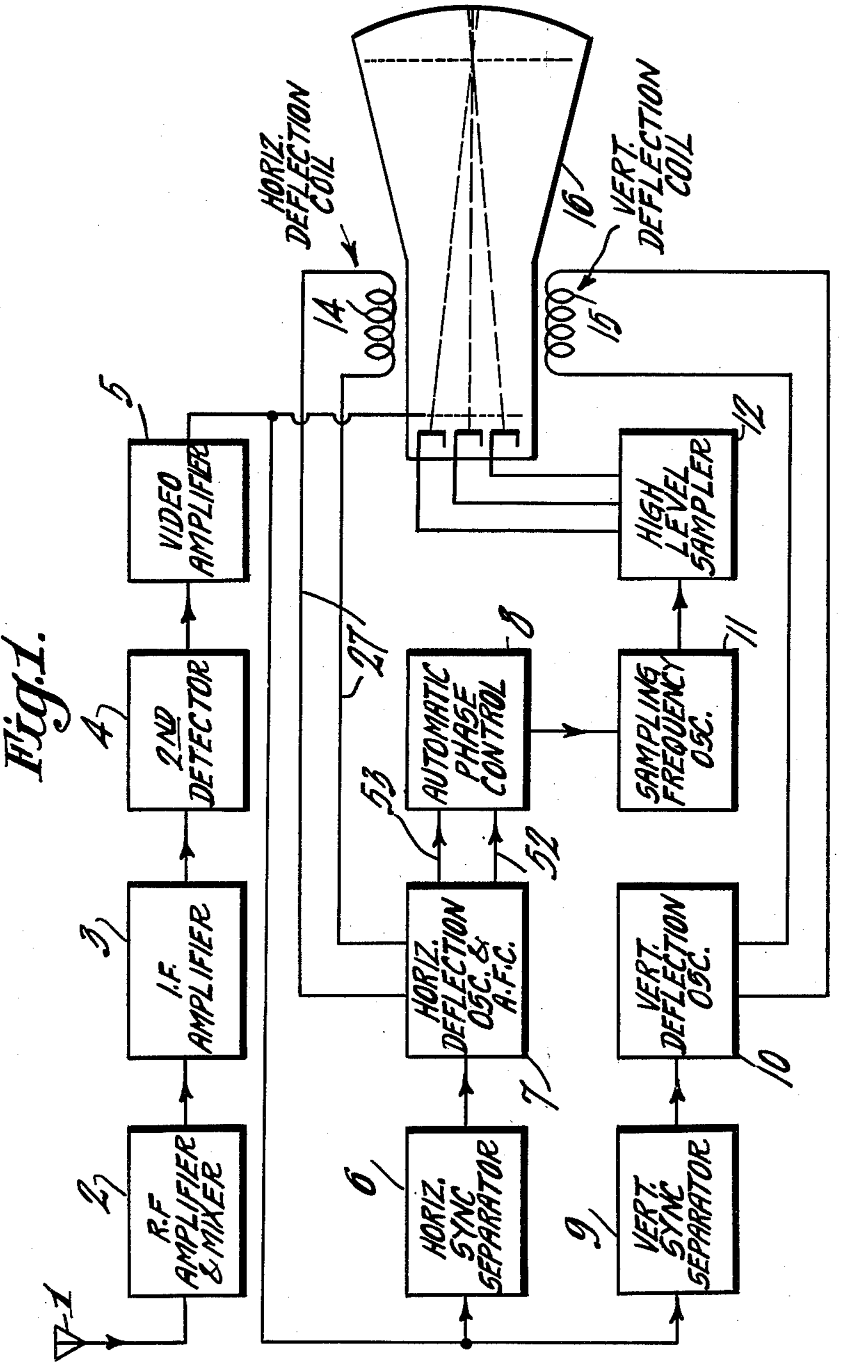
Fig. 1 shows in block form the basic components of a color television receiver employing the principles of the invention.

Referring now to Fig. 1, there has been shown a color television receiver incorporating the invention. The radio frequency signal is picked up by a suitable wave pick-up device 1, preferably a directive antenna, and coupled to the RF amplifier and mixer 2. The intermediate frequency signal produced by the mixer 2 is coupled to an IF amplifier 3. The amplified IF signal from the amplifier 3 is coupled to a second detector 4 and the detected video signal from the detector 4 is coupled to a video amplifier 5. The amplified video output from the amplifier 5 is coupled to the control grids in the three-gun color kinescope 16 and to the vertical and horizontal sync separator circuits 9 and 6. The vertical sync separator 9 selects the vertical synchronizing pulse and utilizes the timing information gained therefrom to control the vertical deflection oscillator 10 which, in turn, drives the vertical deflection winding 15.

The horizontal sync separator circuit 6 selects the horizontal synchronizing pulse and couples it to the horizontal deflection oscillator and its associated circuitry 7. This component includes the horizontal deflection oscillator and the automatic frequency control circuits of the flywheel type described above.

The horizontal deflection oscillator 7 has two output leads 27 which pass signals to the horizontal deflection winding 14. Another output lead 53 couples the frequency controlled pulses generated by the horizontal deflection apparatus 7 to the automatic phase control unit 8 and still another output lead 52 couples the D.-C. control voltage generated by the comparator circuit contained in apparatus 7 to the automatic phase control unit 8.

The automatic phase controlled pulse produced by apparatus 8 is coupled to the sampling frequency oscillator 11 and the sine wave output from the sampling frequency oscillator is coupled to the high level sampler 12. The three-phase displaced pulses produced by the high level sampler 12 are coupled to the cathode 19 of the three-gun color kinescope 16.

With the exception of the automatic phase control device 8, added in accordance with the invention, the operation of the illustrated embodiment of the invention is believed clear. Briefly, video signals are applied to the three grids of the color kinescope 16 simultaneously. The kinescope is provided with an apertured mask interposed between the three guns and the dot phosphor screen. The screen is composed of an orderly array of small, closely spaced, aluminized phosphor dots arranged in triangular groups, each group comprising a green-emitting dot, a red-emitting dot and a blue-emitting dot. The mask is so interposed that electrons from any one gun can strike only a single color phosphor no matter which part of the raster is being scanned. The mask is comprised of a sheet of metal spaced from the phosphor screen and containing one aperture for each of the tri-color-dot groups. This aperture is so registered with its associated dot group that the difference in the angle of approach of the three oncoming beams determines the color. The guns are keyed on in sequence and in synchronism with the appearance of information of a corresponding color on the control grids. The guns are keyed by signals from the high level sampler 12 which, in turn, is controlled by the sampling frequency oscillator 11. The high level sampler, keys the guns on only for a portion of the color component cycle and hence, there is necessitated a predetermined time interval between the received synchronizing pulses and the pulses from the sampling oscillator. For a more detailed description of the operation of this arrangement, reference is made to the aforementioned publication.

Figure 2:
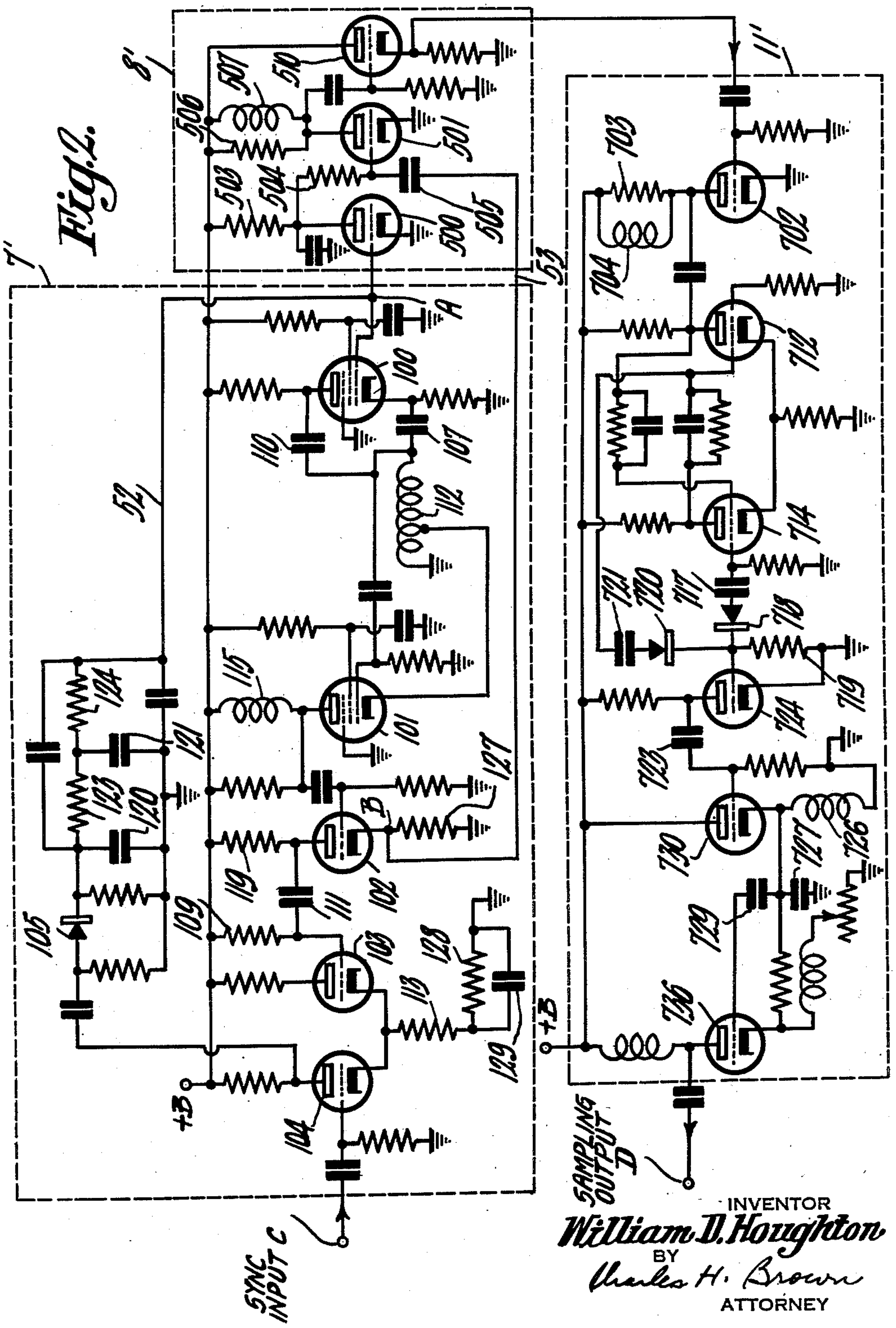
Fig. 2 shows schematically and in more detail the circuitry of some of the components of Fig. 1; and, Fig. 3 is a series of curves explanatory of the operation of the arrangement of Fig. 2.
Figures 3A, 3B, 3C, 3D, 3E, 3F, 3G, 3H, 3I, 3J, 3K:
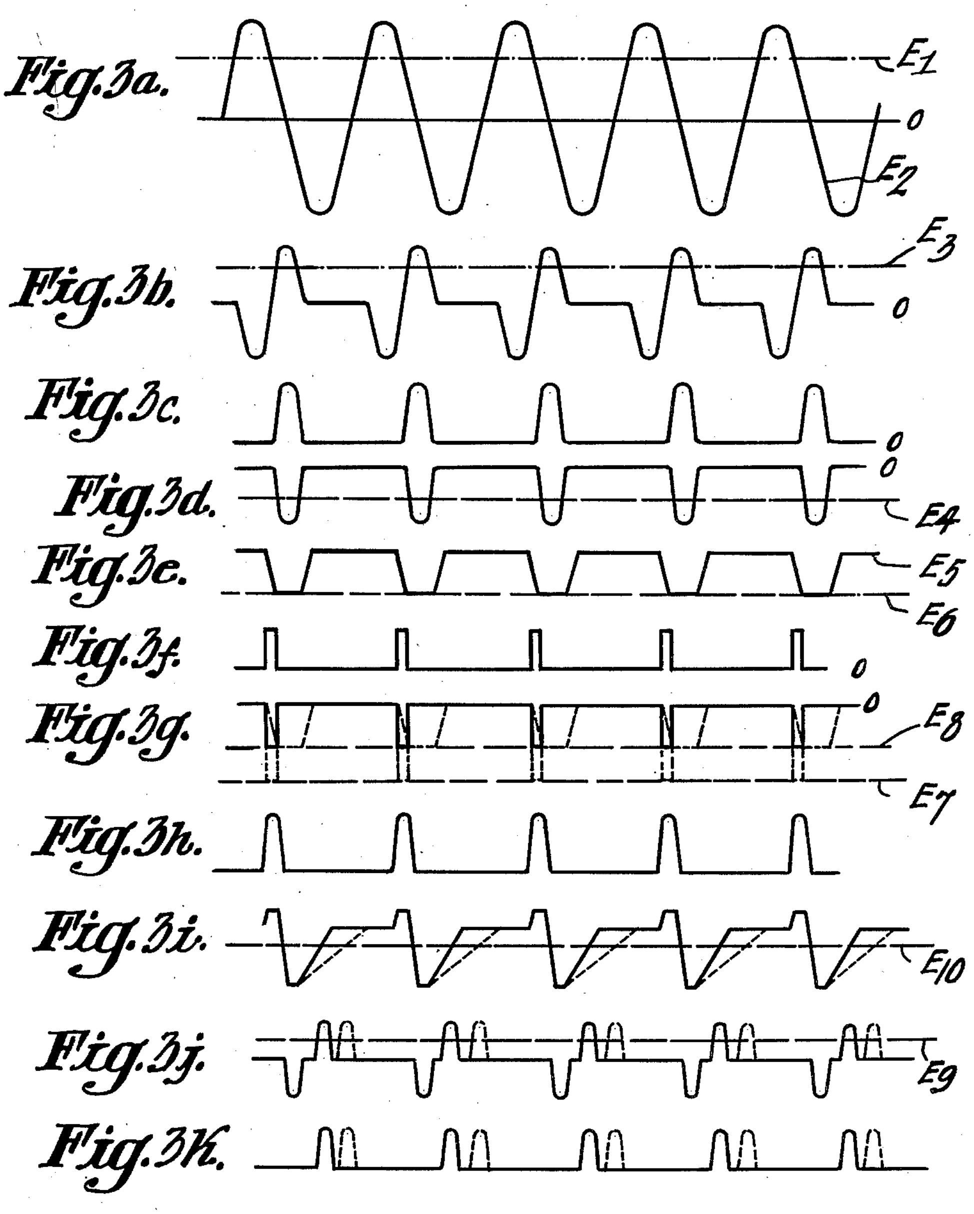

The circuitry of the automatic frequency control arrangement of component 7 of Fig. 1, the automatic phase control component 8 and the sampling frequency oscillator 11 is shown in more detail in Fig. 2. The operation of the automatic frequency control circuit may be understood by reference to that portion of Fig. 2 included within the dotted box 7'. Vacuum tube 101 together with the coil 112 and the condensers 110 and 107 form a conventional Hartley oscillator. Vacuum tube 100 forms part of a reactance tube circuit which is used to control automatically the oscillating frequency of the oscillator in a conventional manner. The waveform of Fig. 3*a* represents the voltage wave $E_2$ developed at the grid of tube 101. Fig. 3*b* represents the voltage wave appearing across the anode coil 115. The horizontal dash-dot line $E_1$ in Fig. 3*a* indicates the voltage above which tube 101 becomes conducting and the horizontal dash-dot line $E_3$ in Fig. 3*b* indicates the voltage level above which vacuum tube 102 becomes conducting. Tube 102 is a grid leak biased clipper amplifier which produces two output signals as shown in Figs. 3*c* and 3*d*. The voltage wave shown in Fig. 3*c* is developed across the cathode resistor 127 and the voltage wave shown in Fig. 3d is developed across the anode resistor 119. The voltage developed across the resistor 119 is coupled to a normally conducting vacuum tube 103 via a coupling condenser 111 as shown.

Tube 103 is normally conducting due to its grid leak 109 being connected to the positive terminal of the source of anode unidirectional potential (not shown).

The current drawn by tube 103 develops a voltage across its cathode resistors 113 and 128 sufficient to cause vacuum tube 104 to be biased below its anode current cut-off condition. Each negative pulse applied to the grid of the tube 103 causes it to cut off and thereby removing a portion of the biasing voltage applied to the cathode of vacuum tube 104. The value of the bypassed resistor 128 (by-passed by condenser 129) is made of a value such that the voltage developed thereacross is just equal to the cut-off potential of tube 104. Thus when tube 103 is conducting, tube 104 is biased considerably below cut-off, and when tube 103 is cut off, tube 103 is biased to its anode current cut-off condition. Fig. 3e represents the voltage wave $E_5$ developed across resistor 113 and the dashed line $E_6$ represents the cut-off voltage of tube 104. Fig. 3f represents the selected horizontal synchronizing pulse applied to the grid of tube 104 via terminal C and coupling condenser 115. The voltage $E_5$ in Fig. 3e developed across resistors 113 and 128 when tube 103 is conducting is made of a value such that tube 104 is biased below cut-off even when the pulses are applied to its grid.

Fig. 3g is a composite figure representing the pulse voltage developed at the anode of tube 104 (solid line pulse) and the biasing voltage developed across resistor 113 (dashed line pulse).

It will now be seen that if the pulses of Fig. 3f occur between adjacent pulses shown in 3e, the tube 104 will not conduct and there will be no pulse developed at the anode of tube 104. It will also be seen that if the pulses of Fig. 3f occur midway on the negative-going portion of the wave of 3e, a negative pulse will be developed, at the anode of tube 104, with a voltage equal to $E_8$ and if the pulses of Fig. 3f occur at the most negative portion of the wave of Fig. 3e, a voltage pulse equal to $E_7$ will be developed.

The negative pulses developed at the anode of tube 104 are detected in a peak detector diode 105 and the resulting D.-C. voltage is filtered by means of a low pass filter consisting of resistors 123 and 124 and condensers 120 and 121. The resulting D.-C. voltage is coupled to the grid of the reactance tube 100 at A via lead 32.

When the pulses of Fig. 3f occur midway on the negative-going portion of the waveform of Fig. 3e, the optimum operating condition is obtained. When the relative timing between the pulses of 3e and 3f tries to change, the D.-C. voltage developed by the diode 105 changes in a direction and by an amount such as to cause the reactance tube 100 to operate in a manner such as to resist the change as in conventional "AFC" circuits.

However, any change in timing results in a permanent shift in the timing of the pulse produced at B with respect to the pulse applied at C, in order to produce the necessary correcting voltage change on lead 52. Only when there is infinite amplification between the comparator output and the reactance tube input, can the change be made equal to zero.

By employing the circuit and ideas of this invention, it is possible to compensate for the inherent time shift permitted by the AFC circuits and produce, in effect, infinite amplification in the feed back lead 52.

In order to compensate for the time shift allowed by the AFC circuits there is provided in accordance with the invention the circuitry shown within the dotted line 8'. This figure corresponds to the automatic phase control unit indicated by the box 8 in Fig. 1. Tube 501 is operated in a normally conducting condition by returning the grid lead path to a source of anode potential (not shown) through resistors 504 and 503 as shown. The positive pulses as shown in Fig. 3h, developed across the cathode resistor 127 at B is coupled to the grid of tube 501 through a small differentiating condenser 505 as shown. Each pulse so applied causes electron current from the grid of tube 501 to flow into condenser 505 storing a charge therein. Immediately following application of the pulse, the charge stored in 505 starts to leak off through resistors 504 and 503 developing the negative portion of the voltage wave shown in Fig. 3i. The horizontal dash-dot line $E_{10}$ represents the voltage below which tube 501 ceases to conduct.

Tube 500 is a D.-C. voltage amplifier to which is connected the correcting voltage developed at the output of the low pass filter, on lead 52 at A. The tube 500 effectively changes the D.-C. voltage applied to the grid of tube 501 and thus changes the time at which the rising edge of the voltage wave, applied to the grid of tube 501, reaches the cut-off potential $E_{10}$ in Fig. 6b.

The coil 507 together with a damping resistor 506 form a differentiating network in the anode circuit of tube 501. Fig. 3j represents the voltage wave developed across the coil 507.

It will be seen that as the D.-C. voltage applied to the grid of tube 500 is changed, the occurrence time of the positive portion of the pulse developed across coil 507 changes, as indicated by the dotted lines in Fig. 3j and 3k. Tube 510 is a grid leak biased clipper amplifier which couples the positive portion of the pulse developed across the coil 507 to the output correction terminal D. By adjusting the amplification of the tube 500 to be of the correct value, the time shift produced in the positive portion of the pulse developed across coil 507 may be made equal and opposite to the time shift produced by the automatic frequency control circuits.

Referring to the portion of the circuitry within the dotted box 11' there is shown an embodiment of the invention utilizing the 3e automatic phase controlled pulses, to control the sampling frequency oscillator indicated by the box 11 in Fig. 1.

Coil 704 together with the damping resistor 703 form a differentiating circuit in the anode of a normally non-conducting grid leak biased amplifier tube 702.

Tubes 712 and 714 together with their associated circuit components, form a flip-flop circuit to divide the pulse frequency. The positive portion of the pulse developed across the coil 704 causes the flip-flop circuit to flip to one condition of operation (namely tube 714 conducts and tube 712 is caused to cut off) and the following negative portion of the pulse causes the flip-flop circuit to reverse operations (tube 712 conducting and tube cut off). The time constants of the flip-flop circuit is so arranged that the circuit will not be operated by the positive portion of the same pulse in which the negative pulse caused the flip-flop circuit to operate.

Condenser 721, diode 720 and resistor 719 form a differentiation circuit which differentiates the negative-going portion of the anode wave developed by tube 712 and condenser 717, diode 718 and resistor 719 form another differentiator circuit which differentiates the negative-going portion of the anode wave developed at the anode of tube 714. Since resistor 719 is common to both differentiator circuits, the differentiated pulses developed from the anodes of 712 and 714 are produced across resistor 719.

Tube 724 is a normally conducting amplifier which inverts and amplifies the pulses developed across the resistor 719. The resulting positive pulses are coupled to a normally non-conducting grid leak biased amplifier tube 730 via a coupling condenser 728.

Tube 736 together with coil 726 and condensers 729 and 727 form the sampling frequency oscillator. The tube 730 when keyed on stops the oscillator until such time as the tube is again cut off. Thus the sampling signal oscillator is stopped and started at the occurrence of each positive pulse applied to the grid of tube 730. Since the oscillator is started at the end of each pulse the timing of the oscillator output is locked in with the pulses applied to the grid of tube 730 which are in turn locked in with the pulses applied to terminal D.

By means of the above method of operation, the dot interlace techniques are carried out in the TV receiver, i e. the sampling pulses for the alternate lines are in effect interlaced in time to produce a dot interlaced signal on the kinescope screen.

The above is accomplished by making the time of the flip-flop circuit consisting of tubes 712 and 714 faster in transition in one cycle of operation than in the other, as a result of which the alternate pulses applied to tube 724 are slightly displaced in time, (displaced by one-half the time of the sampling signal repetition rate) or $$\frac{1}{3.8}\times 10^{-6} \text{ second}$$

What is claimed is:

1. A pulse phase shifter comprising in combination, a first amplifier having an output electrode and a control electrode, a condenser connected to said control electrode, said condenser being adapted to be charged from a source of synchronizing pulses, a discharge path connected to said control electrode whereby said condenser may be discharged, a second amplifier connected across at least a portion of said discharge path, said second amplifier having a control electrode adapted to be energized by a control voltage whereby the phase of the pulses passed by said third amplifier with respect to said synchronizing pulses varies in accordance with said control voltage means differentiating the output of said first amplifier to produce positive and negative pulses for each of said synchronizing pulses, a third amplifier having input and output circuits, and means connecting said differentiated output to the input circuit of said third amplifier, said third amplifier being biased to pass only said positive pulses.

2. In communication apparatus having a first pulse generator provided with automatic frequency control circuits which produce a direct current control voltage varying in accordance with the degree of asynchronism between the pulses generated by said pulse generator and a source of synchronizing pulses, means producing a second series of pulses which are automatically maintained in a predetermined phase and frequency relationship with said first mentioned pulses comprising in combination, a second pulse generator actuated under the control of said first mentioned pulses, means for applying said control voltage to said second pulse generator so as to shift the phase of the pulses produced by said second pulse generator relative to the phase of said first mentioned pulses an amount equal and opposite to the time shift produced in said first pulse generator by said automatic frequency control circuits, a third pulse generator, and means applying the pulses from said second pulse generator to said third pulse generator to control the phase and frequency of the pulses produced by said third pulse generator.

3. Communication apparatus according to claim 2 in which said last mentioned means includes means differentiating the pulses from said second pulse generator, means producing control pulses from said differentiated pulses and an oscillator keyed by said control pulses.

4. Communication apparatus according to claim 3 in which each of said differentiated pulses consists of a positive and a negative pulse and in which the means producing the control pulses includes a frequency divider whereby the frequency of said control pulses is equal to the frequency of the pulses from said second generator.

5. In a color television receiver utilizing a local pulse generator for actuating deflection circuits and a sampling oscillator for producing color selection high frequency pulses, said pulse generator being provided with an automatic frequency control circuit which produces a direct current control voltage varying in accordance with the degree of asynchronism between the pulses generated by said local pulse generator and scanning synchronizing signals, the combination of means maintaining a predetermined phase relationship between said deflection pulses and said color selection pulses comprising a second pulse generator actuated under the control of said scanning pulses, means for applying said control voltage to said second pulse generator so as to shift the phase of the pulses produced by said second generator relative to said scanning pulses an amount equal and opposite to the time shift produced in said scanning pulses by said automatic frequency control circuit, a third pulse generator, means applying the pulses from said second generator to said third pulse generator, and means keying said sampling oscillator by the pulses produced by said pulse generator.

6. A color television receiver comprising in combination a tri-color cathode ray tube having deflection circuits, means developing composite color component signals, means applying said color component signals to said cathode ray tube, a local pulse generator controlling the actuation of said deflection circuits in accordance with a source of synchronizing pulses, said pulse generator having automatic frequency control circuits which produce a direct current control voltage varying in accordance with the amount of asynchronism between said deflection pulses and said synchronizing pulses, a second pulse generator actuated under the control of said scanning pulses, means applying said control voltage to said second pulse generator so as to shift the phase of the pulses produced by said second generator relative to said scanning pulses an amount equal and opposite to the time shift produced in said scanning pulses by said automatic frequency control circuits, a third pulse generator actuated under the control of pulses from said second pulse generator, a sampling oscillator, means keying said sampling oscillator by pulses from said third pulse generator, and means connecting the output of said sampling oscillator to said cathode ray tube whereby said cathode ray tube produces color component images in accordance with said color component signals.

References Cited in the file of this patent

UNITED STATES PATENTS

| Number | Name | Date |
|---|---|---|
| 2,296,919 | Goldstine | Sept. 29, 1942 |
| 2,399,421 | Artzt | Apr. 30, 1946 |
| 2,504,663 | Dome | Apr. 18, 1950 |
| 2,538,041 | Reeves | Jan. 16, 1951 |